UNITED STATES PATENT OFFICE.

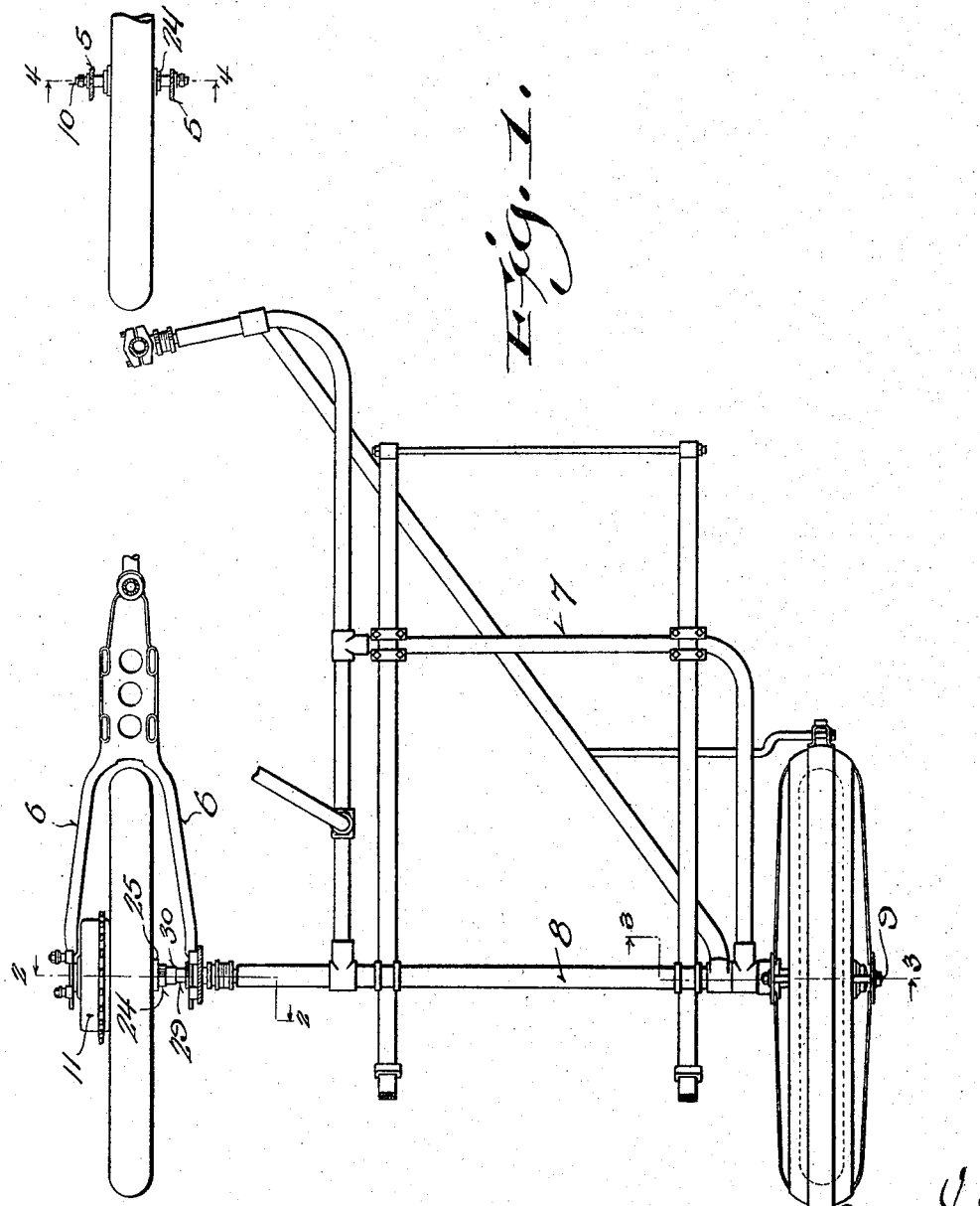

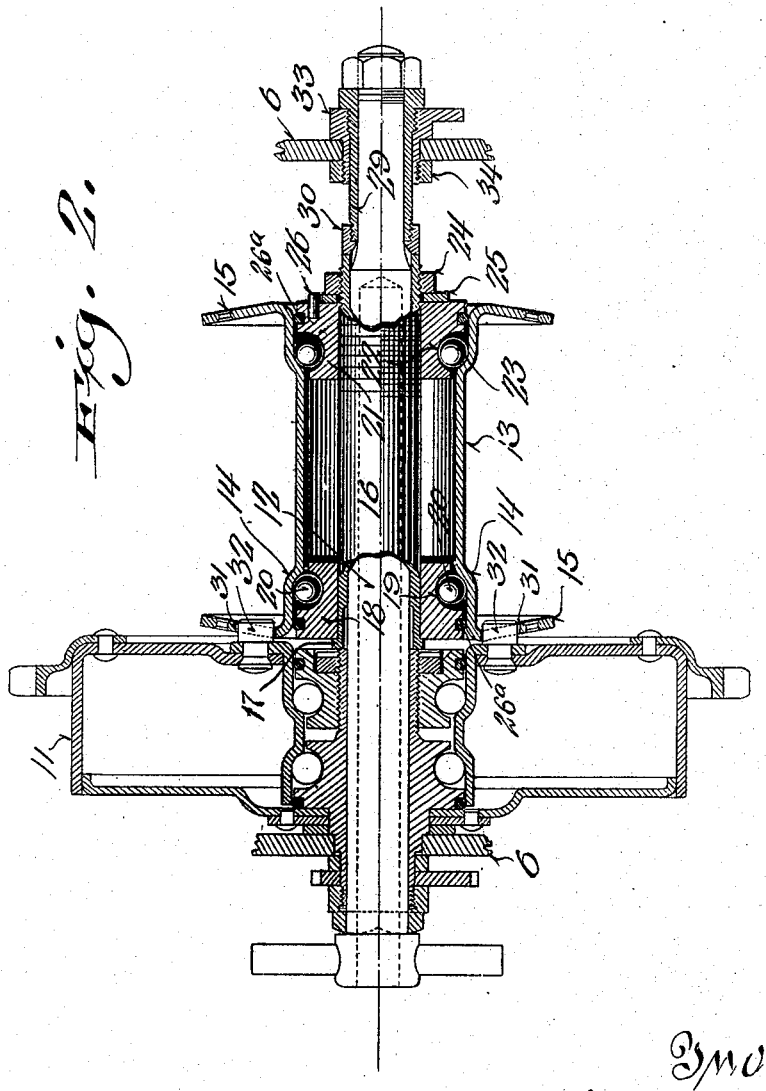

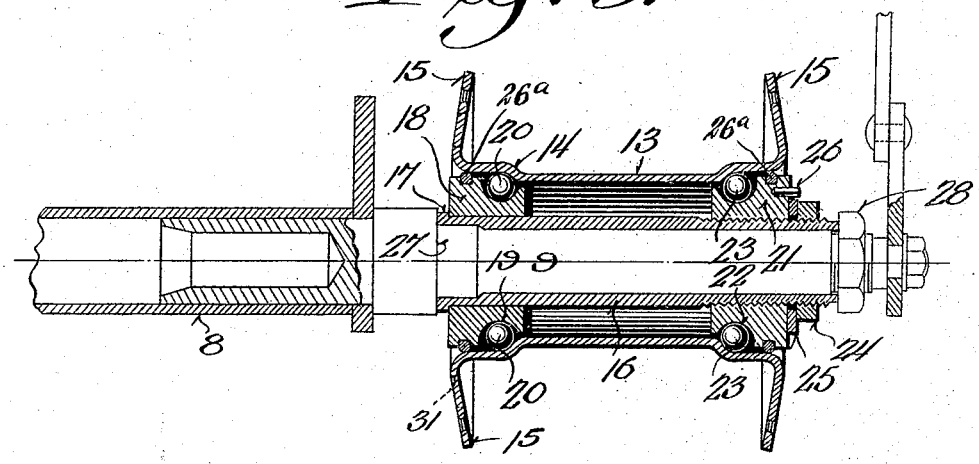
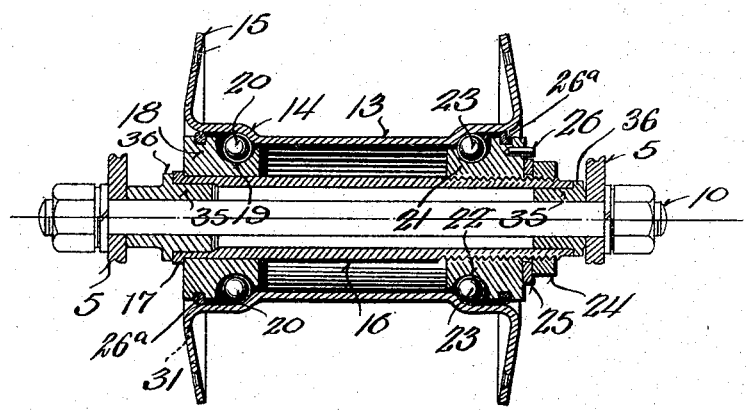

WILLIAM S. HARLEY, OF MILWAUKEE, WISCONSIN, ASSIGNOR TO HARLEY-DAVIDSON MOTOR CO., OF MILWAUKEE, WISCONSIN.

INTERCHANGEABLE WHEEL-HUB.

1,203,612.  Specification of Letters Patent.  Patented Nov. 7, 1916.

Application filed January 17, 1916. Serial No. 72,436.

*To all whom it may concern:*

Be it known that I, WILLIAM S. HARLEY, a citizen of the United States, and resident of Milwaukee, in the county of Milwaukee and State of Wisconsin, have invented certain new and useful Improvements in Interchangeable Wheel-Hubs; and I do hereby declare that the following is a full, clear, and exact description thereof.

The present invention relates to new and useful improvements in vehicle wheel hubs and is more particularly directed to the provision of hubs for motorcycles and like structures.

Motorcycles are commonly employed in connection with side car structures attached thereto and including a wheel somewhat similar to one of the motorcycle wheels and it is primarily an object of the present invention to provide a hub structure for the side car wheel which adapts the wheel to be interchangeably applied to either the front or rear axle of the motorcycle, to thus provide for emergency conditions of use in the event of one of the usual motorcycle wheels being broken.

It is further an object of the invention to provide a hub structure which is of exceedingly simple and economical construction and which may be readily associated in its various applications.

With the above and other objects and advantages in view, the invention resides more particularly in the novel combination, arrangement and formation of parts more particularly hereinafter described and particularly pointed out in the appended claims.

In the drawings: Figure 1 is a top plan view of frame portions of a motorcycle and side car structure with each of the axles of which is associated the improved interchangeable hub member. Fig. 2 is a vertical sectional view taken through the rear motorcycle axle and showing the hub in conjunction therewith, this view being taken on the line 2—2 of Fig. 1. Fig. 3 is a similar view on the line 3—3 of Fig. 1 through the side car axle. Fig. 4 is a similar view on the line 4—4 of Fig. 1 through the front axle of the motorcycle.

Referring now more particularly to the accompanying drawings, 5 and 6 designate respectively the front and rear wheel forks of a motorcycle, and 7 designates generally the side car frame, which includes a rear bar portion 8 connected at its inner end adjacent the rear forks 6 and carrying at its outer end the axle spindle 9. The front forks carry an axle 10 and the rear forks carry a transmission drum 11 from which projects the rear axle 12.

The improved interchangeable hub structure comprises a hub cylinder 13 which is formed preferably of pressed steel and which has its end portions outwardly offset to form annular ball race shoulders 14 the extremities of the cylinder being bent outwardly to form annular flange portions 15 which carry the spoke wires. Disposed through the cylinder is the axle receiving sleeve 16 formed at one end with a circumscribing annular rib 17 and having its other end threaded and slidable on the sleeve to abut against the rib 17 is a ball race sleeve 18 which is provided with an annular groove 19 adapted in conjunction with the shoulder 14 to hold a series of ball bearings 20. Threaded on the other end of the sleeve is a second sleeve 21 which is provided with a similar ball race groove 22 holding the ball bearings 23 and this sleeve is retained in desired position by a lock nut 24 threaded on the sleeve and bearing against a washer 25 interposed between it and the said sleeve, this washer being held against rotation by a pin 26 projecting outwardly from the sleeve. It is noted that the sleeves 18 and 21 form bearing cones, but differ from the usual cones in that they are formed with more positive grooves in their peripheries which assist in positioning the ball bearings. These sleeves are provided in their outer portions with conventional dust rings 26$^a$. Thus a wheel including the hub cylinder 13 may revolve freely on and be held by the sleeve 16 and this sleeve is primarily adapted to fit the axle spindle 9 of the side car structure, and to be held thereon by abutment with a shoulder 27 formed at the inner portion of the spindle and by a nut 28 threaded on the outer portion of the spindle.

It is noted that the main portion of the rear motorcycle axle 12 is of the same diameter as the axle 9, and thus the improved hub may be applied to this axle by inserting the axle through the sleeve 16. The present hub, however, is of lesser width than the usual rear wheel hub, and to hold the hub against the transmission drum 11, an abutment sleeve 29 is slidable on the outer end of the axle spindle 12 and carries an abutment cap 30 which bears against the end of the sleeve 16 and thus holds the hub in a position wherein a series of apertures 31 which are provided in its flange portion 15 adjacent the transmission drum may receive studs 32 carried and projecting from the drum to thus interlock the wheel with the drum whereby it may be driven. The rear fork member 6 adjacent the sleeve 29 is held against movement with respect thereto by a sleeve 33 threadedly mounted on the sleeve 29 and passed through the fork opening and provided with a nut 34 threaded on its outer end to bind the fork member therebetween.

In applying the improved hub to the front axle 10 it is noted that the interchangeable hub is slightly narrower than the usual front wheel hub and that the axle 10 is of considerably lesser diameter than the sleeve 16, and to compensate for this, spacing sleeves 35 are provided on the end portions of the axle with their outer diameters equal to the inner diameter of the sleeve 16 and engaged in the end of the same to hold it, these sleeves being provided with annular ribs 36 which abut the ends of the sleeve 16 to hold it against lateral movement.

Thus a wheel hub is provided which is normally adapted for use in connection with the axle of a side car, but which may be associated readily with either the front or rear axle of a motorcycle to meet emergency conditions should the usual front or rear wheel of the motorcycle become broken. It is, however, noted that the interchangeable feature above mentioned is not the only advantageous feature of the present hub, since the hub in itself comprises an exceedingly simple structure and possesses various advantages of economy in construction.

I claim:

1. In a motorcycle and side car structure including front and rear motorcycle axles and a side car axle, a wheel hub normally adapted to be operatively disposed on the side car axle, means including spacer members for adapting the hub to be operatively disposed on the rear motorcycle axle, and means including spacer members for adapting the hub to be operatively disposed on the front motorcycle axle.

2. In a motorcycle and side car structure including a side car axle and a front motorcycle axle of lesser diameter than the first axle, the combination of a hub adapted to be operatively disposed on the side car axle and means for adapting the hub for operative connection with the front axle including sleeve members engageable on the end portions of the front motorcycle axle and adapted to fit in the ends of the hub bore, and annular abutment ribs carried by the sleeves.

3. In a motorcycle and side car structure including a side car axle, and a rear motorcycle axle of relatively greater length, and carried by fork members, the combination of a hub member adapted to interchangeably engage on the said axles, means for holding the hub spaced from one end of the axle and means for securing the adjacent fork member with respect to the said spacing means.

In testimony that I claim the foregoing I have hereunto set my hand at Milwaukee, in the county of Milwaukee and State of Wisconsin, in the presence of two witnesses.

WILLIAM S. HARLEY.

Witnesses:
ARTHUR J. STEITZ,
EDWIN F. CASPER.

Copies of this patent may be obtained for five cents each, by addressing the "Commissioner of Patents, Washington, D. C."